United States Patent
Saradva

(10) Patent No.: US 11,065,672 B2
(45) Date of Patent: Jul. 20, 2021

(54) PROCESS OF MANUFACTURING OF SEGMENTS FOR CARBON THRUST BEARING

(71) Applicant: Atulkumar Raghavjibhai Saradva, Morbi (IN)

(72) Inventor: Atulkumar Raghavjibhai Saradva, Morbi (IN)

(*) Notice: Subject to any disclaimer, the term of this patent is extended or adjusted under 35 U.S.C. 154(b) by 51 days.

(21) Appl. No.: 16/618,474

(22) PCT Filed: May 31, 2018

(86) PCT No.: PCT/IN2018/050349
§ 371 (c)(1),
(2) Date: Dec. 2, 2019

(87) PCT Pub. No.: WO2018/220648
PCT Pub. Date: Dec. 6, 2018

(65) Prior Publication Data
US 2020/0391275 A1  Dec. 17, 2020

(30) Foreign Application Priority Data
Jun. 3, 2017  (IN) .............................. 201721019553

(51) Int. Cl.
*B21D 53/10* (2006.01)
*B21J 1/06* (2006.01)
(Continued)

(52) U.S. Cl.
CPC ................ *B21D 53/10* (2013.01); *B21J 1/06* (2013.01); *B21J 5/022* (2013.01); *B21J 5/025* (2013.01);
(Continued)

(58) Field of Classification Search
CPC ... B21J 1/06; B21J 5/022; B21J 5/025; B21K 1/04
See application file for complete search history.

(56) References Cited

U.S. PATENT DOCUMENTS 3,778,253 A * 12/1973  Lyne ....................... C22C 38/60
                                                          420/87
3,831,241 A    8/1974  Elmore et al.
(Continued)

FOREIGN PATENT DOCUMENTS

CN       105269270 B       3/2017
JP         2524156 B2 *    8/1996
(Continued)

OTHER PUBLICATIONS

Machine Translation for CN 105269270 B (2017).
Machine Translation for JP 2011174506 A (2011).

*Primary Examiner* — Jacob J Cigna
(74) *Attorney, Agent, or Firm* — Caesar Rivise, PC

(57) ABSTRACT

A process of manufacturing of segment for carbon thrust bearing uses stainless-steel (SS) round bars/sheets/logs of suitable grade as raw material. The SS round bars/sheets/logs undergo cutting operation to cut into SS billets. The billets successively undergo heating and hot forging processes to form segments of desired shapes. Thereafter, the segment is subjected to heat treatment process i.e. stress relieving, hardening and tempering process successively for obtaining consistent and uniform grain structure, mechanical properties and physical properties of segments which are cost-effective in terms of lower maintenance and lower handling efforts. After heat-treatment process, segment undergoes surface-finishing processes i.e. grinding, lapping and polishing successively for obtaining mirror like surface finishing that gives greater anti-friction property and lower co-efficient of friction. The manufacturing process accord- (Continued)

ing to present invention yields consistent grain structure, refine, dense and uniform microstructure of segments which imparts optimum strength, ductility, toughness and resistance to impact and fatigue.

9 Claims, 4 Drawing Sheets

(51) Int. Cl.

| | | |
|---|---|---|
| *B21J 5/02* | (2006.01) | |
| *C21D 1/00* | (2006.01) | |
| *C21D 1/10* | (2006.01) | |
| *C21D 1/18* | (2006.01) | |
| *C21D 1/25* | (2006.01) | |
| *C21D 1/26* | (2006.01) | |
| *C21D 1/42* | (2006.01) | |
| *C21D 6/02* | (2006.01) | |
| *C21D 9/40* | (2006.01) | |
| *F16C 17/04* | (2006.01) | |
| *F16C 33/10* | (2006.01) | |
| *F16C 33/14* | (2006.01) | |
| *C21D 6/00* | (2006.01) | |
| *C21D 8/02* | (2006.01) | |
| *C22C 38/02* | (2006.01) | |
| *C22C 38/04* | (2006.01) | |
| *C22C 38/44* | (2006.01) | |

(52) U.S. Cl.
CPC .................. *C21D 1/00* (2013.01); *C21D 1/18* (2013.01); *C21D 1/25* (2013.01); *C21D 1/26* (2013.01); *C21D 1/42* (2013.01); *C21D 6/002* (2013.01); *C21D 6/02* (2013.01); *C21D 8/0205* (2013.01); *C21D 9/40* (2013.01); *C22C 38/02* (2013.01); *C22C 38/04* (2013.01); *C22C 38/44* (2013.01); *F16C 17/04* (2013.01); *F16C 33/108* (2013.01); *F16C 33/14* (2013.01); *C21D 1/10* (2013.01); *C21D 2261/00* (2013.01); *F16C 2220/46* (2013.01); *F16C 2220/70* (2013.01); *F16C 2223/10* (2013.01); *Y02P 10/25* (2015.11)

(56) References Cited

U.S. PATENT DOCUMENTS

| | | | | |
|---|---|---|---|---|
| 5,002,729 | A * | 3/1991 | Wert | C22C 38/30 |
| | | | | 148/319 |
| 5,455,778 | A * | 10/1995 | Ide | G06F 30/23 |
| | | | | 703/1 |
| 8,361,247 | B2 * | 1/2013 | Vartanov | C22C 38/44 |
| | | | | 148/326 |
| 8,808,472 | B2 * | 8/2014 | Sandberg | C22C 38/46 |
| | | | | 148/325 |
| 9,487,843 | B2 * | 11/2016 | Yuki | C21D 1/10 |
| 10,458,007 | B2 * | 10/2019 | Wert | C21D 8/005 |
| 2009/0252640 | A1 * | 10/2009 | Sandberg | C22C 38/02 |
| | | | | 420/42 |
| 2013/0301969 | A1 * | 11/2013 | Yuki | C21D 1/30 |
| | | | | 384/462 |

FOREIGN PATENT DOCUMENTS

| | | | | |
|---|---|---|---|---|
| JP | 2993829 | B2 * | 12/1999 | C23C 8/38 |
| JP | 2011174506 | A | 9/2011 | |

* cited by examiner

PROCESS OF MANUFACTURING OF SEGMENTS FOR CARBON THRUST BEARING

CROSS-REFERENCE TO RELATED APPLICATIONS

This application is a U.S. National Phase Application of PCT/IN2018/050349, filed May 31, 2018, which claims priority from IN 201721019553, filed Jun. 3, 2017, the contents of which applications are incorporated herein by reference in their entireties for all purposes.

FIELD OF INVENTION

The present invention relates to a process of manufacturing of segments for carbon thrust bearing and more particularly it relates to a manufacturing process which reduces the time for producing the segments from raw materials and improves the mechanical and physical properties i.e. strength, hardness, ductility, toughness and uniform grain structure of the segments for carbon thrust bearing.

BACKGROUND OF INVENTION

The carbon thrust bearings play critical role in submersible motors, pumps, and other mechanical devices as an alternative to regular bearings. The carbon thrust bearings are used worldwide in submersible motors, pumps to ensure proper supply of water to the topmost levels of building and to ensure the safety of the motor and pump in dry running condition. The carbon thrust bearing comprises components i.e. thrust plate, carbon pad, segments and segment carrier. In carbon thrust bearing, the segments play vital role for withstanding the fluctuating loads of submersible motors and pumps during running condition.

In the present era, the segments of the carbon thrust bearings are manufactured by conventional manufacturing process which comprises more number of processing steps for production of segments. The conventional manufacturing process comprises processing steps of wax injection, clusters assembly, slurry coating, stuccoing, de-waxing, backing, molten metal preparation, spectrographic testing for required grade, casting, knockout, cutting off, gates grinding, shot blasting, heat treatment for production of segments of the carbon thrust bearing. This conventional manufacturing process consumes more time from wax injection process to gates grinding process and requires skilled labors for preparing the molten metal as per the required grade and for spectrographic testing of said molten metal. Further, processing steps of conventional manufacturing process are expensive as it requires more infrastructures, costly machineries, consumables and energy which ultimately results in high-cost of the finished segments for carbon thrust bearings.

Various processes for manufacturing of carbon thrust bearing and relevant parts thereof have been developed. One such method of manufacturing carbon thrust bearing has been disclosed in U.S. Pat. No. 3,831,241 in which the bearing and parts thereof produced is having an undesired quenching stress and less ductility. Further, higher forces are required to initiate and complete the deformation of the bearing parts. Further, the quenching stress of the bearing parts reduces the strength of the bearing and bearing parts.

In the conventional manufacturing process, as the segments are producing from the molten metal, the possibility of defects i.e. blow holes, surface impurities, bending and pin holes in the segment of carbon thrust bearing tends to increases (rejection is around 20-30%). Further, the physical and mechanical properties i.e. strength, hardness, ductility, toughness and uniform grain structure of the segments produced by conventional manufacturing process are poor. In addition, the conventional manufacturing process takes minimum 4 to 5 weeks to produce the segments of carbon thrust bearing from the raw materials.

Therefore, it can be seen that a need yet exist for an economic, timesaving and an efficient manufacturing process that eliminate the existing tedious and expensive process for producing the segments and has exceptional strength, hardness, ductility, toughness and uniform grain structure of segments for carbon thrust bearing.

Object of Invention

The main object of the present invention is to provide a process of manufacturing of segments for carbon thrust bearing.

Another object of the present invention is to provide a process of manufacturing of segments for carbon thrust bearing that provides exceptional strength, hardness, toughness, ductility and uniform grain structure of the segments.

Yet, another object of the present invention is to provide a process of manufacturing of segments for carbon thrust bearing which reduces the time of manufacturing process of segments and also reduces the cost of segments.

Still, another object of the present invention is to provide a process of manufacturing of segments for carbon thrust bearing that reduces the possibility of defects i.e. blow holes, surface impurities, bending, and pin holes in the segment.

SUMMARY OF INVENTION

Figure 1:
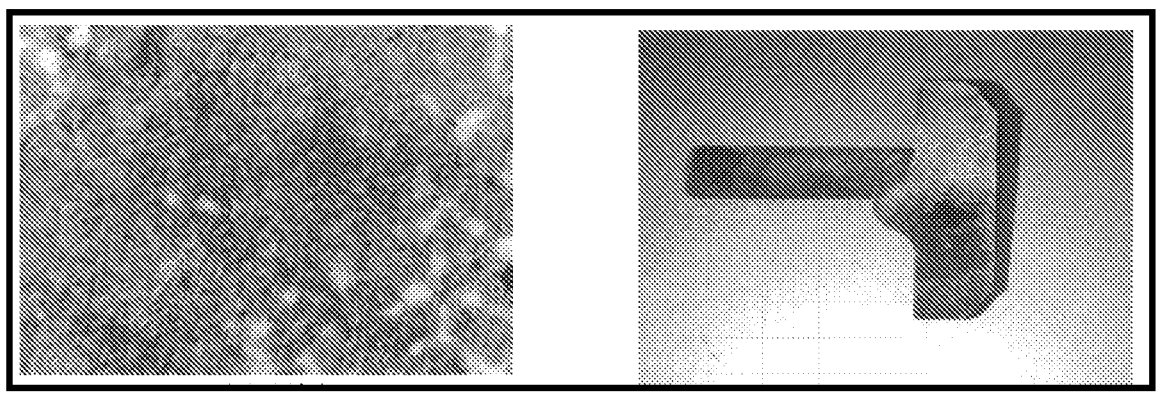
FIG. 1 illustrates a photographical representation of microstructure of the segment obtained by conventional investment casting process according to the prior art which shows lack of consistent grain structure and grain flow of the segment for carbon thrust bearing.

A process of manufacturing of segment for carbon thrust bearing of the present invention uses stainless-steel (SS) (round bars)/sheets/logs of suitable grade as raw material. The SS (round bars)/sheets/logs undergo cutting operation to cut into SS billets of predetermined sizes. The billets are heated in induction furnace at 900° C.-1000° C. Thereafter, billets undergo open-die hot forging or closed-die hot forging for acquiring the desired shape of segments. After open-die hot forging, the segment is subjected to trimming-grinding processes successively to remove the flashes formed on edges of the segment. For closed-die hot forging, trimming-grinding processes are not required. Thereafter, the segment is subjected to heat treatment process i.e. stress relieving, hardening and tempering process successively for obtaining predetermined mechanical properties and physical properties of segments which are cost-effective in terms of lower maintenance and lower handling efforts. After heat-treatment process, the segment undergoes surface-finishing processes i.e. surface grinding for obtaining final finished surface and thereafter lapping and polishing process are successively carried out for obtaining optimum degree of flatness and mirror like surface finishing of segment that gives greater anti-friction property and lower co-efficient of friction.

DETAILED DESCRIPTION OF INVENTION

The nature of the invention and the manner in which it works is clearly described in the provisional specification. The invention has various embodiments and they are clearly described in the following pages of the provisional specification. Before explaining the present invention, it is to be understood that the phraseology and terminology employed herein is for the purpose of description and not of limitation.

The present invention refers to a manufacturing process to eliminate the excess processing steps of the conventional process of manufacturing of the segments for carbon thrust bearings and to achieve exceptional strength, hardness, ductility, toughness and uniform grain structure of the segments for carbon thrust bearing.

Before explaining the present invention, it is to be understood that the term "re-crystallization temperature" refers to the temperature at which the deformed grains of metal are replaced by a new set of defects-free (stress-free) grains for reduction in strength and hardness and simultaneous increase in ductility. The re-crystallization temperature for steels is typically ranges between 400° C.-700° C.

In accordance with the present invention, the process of manufacturing of segments for carbon thrust bearing uses stainless steel (hereinafter referred as SS) round bars/sheets/logs as raw material or feed stock. This SS round bars/sheets/logs undergo cutting operation in cutting press to cut into SS billets of predetermined size. Thereafter, the steel billets are heated in induction furnace at 900° C.-1000° C. above its re-crystallization temperature to reduce the residual stress and for making it easy for machining. The induction heating provides quick, efficient and uniform heating of the steel billets. The heated SS billets undergo hot forging process preferably in mechanical press, hydraulic press or friction screw press having forging dies for forming the desired shape of the segments for carbon thrust bearing. In hot forging process, the SS steel billets are positioned between the forging-dies and subjected to a (single or) plurality of strokes through the ram/piston of the mechanical press, hydraulic press or friction screw for forming the desired shape of segments. In hydraulic press a (single or) plurality of strokes is applied on the ram/piston through the hydraulic fluid pressure. In mechanical press and friction screw press, a (single or) plurality of strokes is applied on the ram/piston through the motor. After hot forging process, the steel billets acquire the desired shape of the segments according to the shape of the dies.

If the open dies are used in hot forging process, it is called open-die hot forging process and if closed dies are used in hot forging process, it is called closed-die hot forging process.

During open die hot forging process, a thin layer of squeezed metal is formed on the edges of said segment and parting line of the mold, said a thin layer of squeezed metal is called as "flash". Hence, after open-die hot forging process the segment is required to be subjected to trimming and grinding process successively preferably in power press and bench grinder respectively to remove the flashes formed on the edges of the segment during open-die hot forging and to get precision surface finishing of the segment. If the closed dies are used in hot forging process, the flashes formed on the edges of segment during closed-die hot forging process is negligible and hence the trimming and grinding processes are eliminated. The closed-die hot forging is also known as impression die forging process.

Thereafter, for achieving desired mechanical and physical properties of the resultant segment, the heat treatment process i.e. stress relieving, hardening and tempering is successively carried out in order to obtain fine and uniform grain structure of the segment and to increase the strength, hardness, ductility and toughness of the segment for carbon thrust bearing. In stress relieving process, the segment is heated up to temperature of 545° C.-555° C. in an oven or furnace and holding at that temperature long time enough to achieve desired reduction in internal residual stresses and then the segment is cooled at a sufficiently slow rate to avoid formation of excessive thermal stress. The reduction in internal residual stresses of segment depends on the composition of steel, selection of temperature, time and rate of cooling.

It is to be understood that the term "critical temperature" is the transformation temperature at which the steel goes into solid solution where atoms of the metals and atoms of the carbon in the steel mix freely and ultimately bond together. The temperature at which this process begins is called lower critical temperature of the steel. The critical temperature for steels is generally ranges from 1335° F.-1525° F. (724° C.-830° C.). The lower critical temperature for steels is usually ranges from 600° C.-724° C.

After stress relieving process, the segment is subjected to hardening process for increasing the hardness and toughness of the segment and to acquire uniform grain structure of the segment. In hardening process, the segment is heated at 1040° C. above its critical temperature in furnace and holding the segment at this temperature for definite period of time about 80-120 minutes and then quenched in quenching medium of oil or air till it reaches to room temperature to achieve the desired hardness of the segment. The time generally depends upon the material characteristics, dimension and thickness of the segment and the hardness of segments achieved depends on rate of quenching. It is to be noted that sudden quenching greatly increases the hardness of the segments.

After hardening, the tempering process is carried out to remove the quenching stress, to reduce brittleness and excess hardness, to increase toughness and to obtain predetermined mechanical and physical properties of the segments. In tempering process, the hardened segment is reheated at temperature 245° C.-255° C. below its lower critical temperature and gradually cooled at room temperature at required cooling rate to relive quenching stresses and to obtain required values of mechanical properties i.e. strength, hardness, ductility, toughness. The segment obtained after tempering is having better mechanical and physical properties. The mechanical properties of the segment also depend upon the tempering temperature, tempering time and cooling rate. The heat treatment process increases the mechanical properties i.e. wear resistance and corrosion resistance. After heat treatment process, the segment undergoes surface finishing processes i.e. surface grinding for obtaining final finished surface and thereafter lapping and polishing process are successively carried out for obtaining optimum degree of flatness and mirror like surface finishing of segment that gives greater anti-friction property and lower co-efficient of friction. Further, said surface finishing processes i.e. surface grinding, lapping and polishing are carried out on grinding machine, lapping machine and polishing machine respectively.

Figure 2:
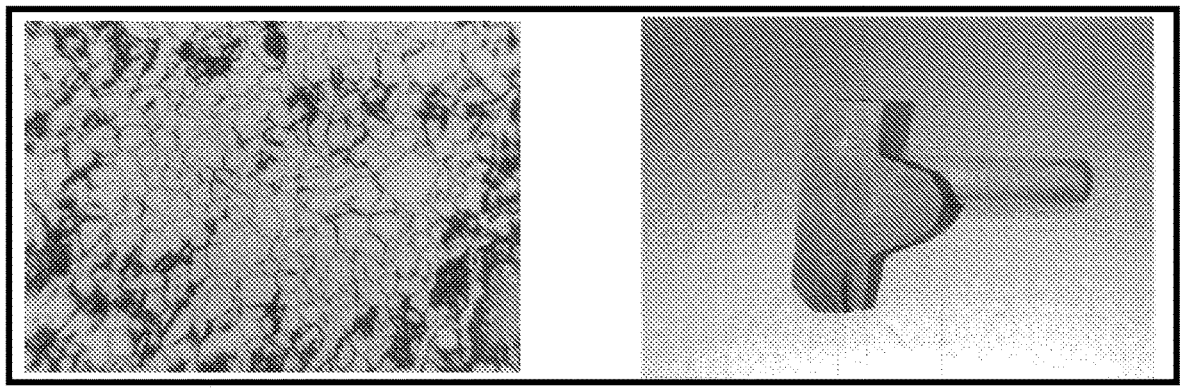
FIG. 2 illustrates a photographical representation of microstructure of the segment obtained by the present manufacturing process according to the present invention which shows consistent grain structure and grain flow of the segment for carbon thrust bearing.
Figure 3:
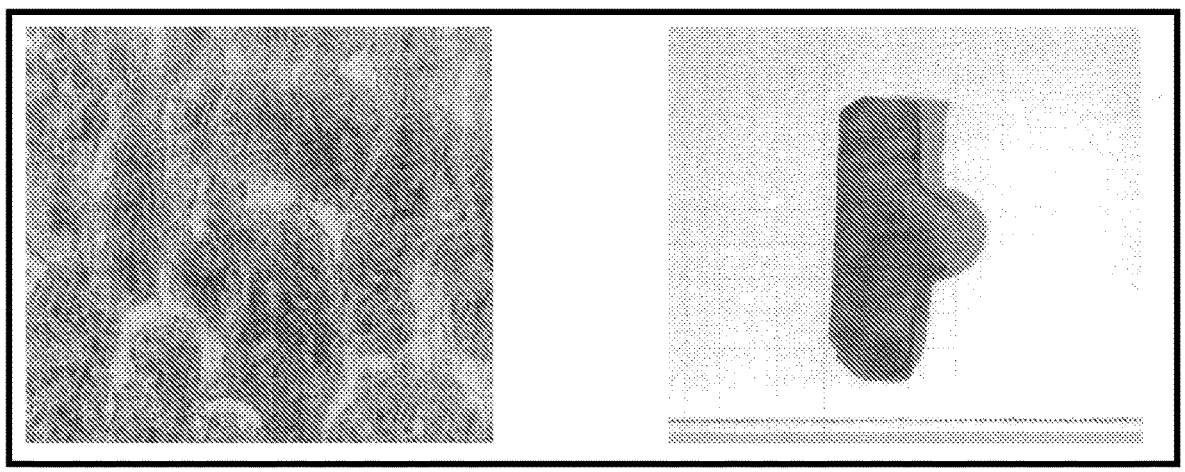
FIG. 3 illustrates a photographical representation of microstructure of the segment obtained by conventional investment casting process according to the prior art which shows unrefined and non-uniform microstructure of the segment for carbon thrust bearing.
Figure 4:
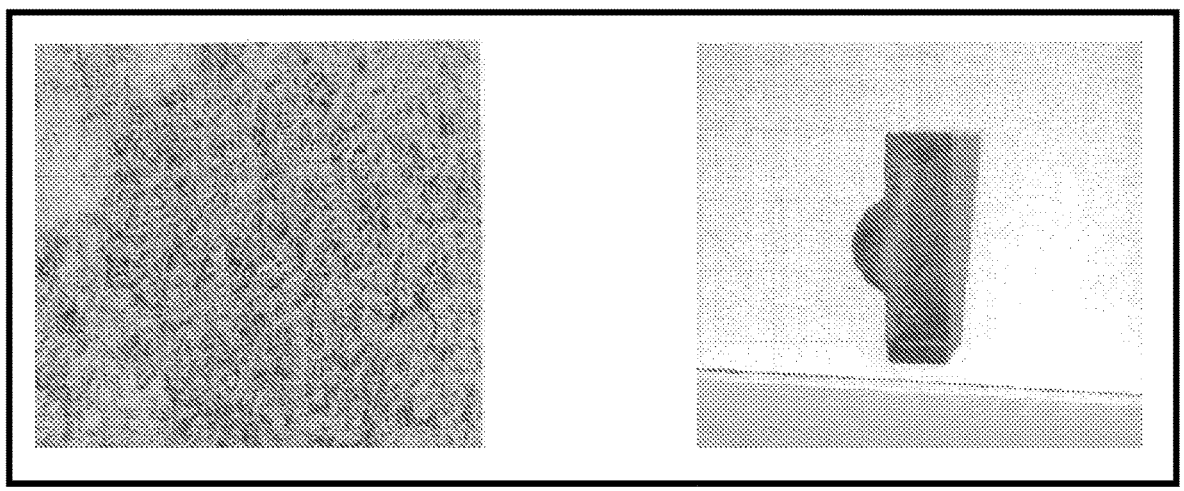
FIG. 4 illustrates a photographical representation of microstructure of the segment obtained by the present manufacturing process according to the present invention which shows more refined, dense and uniform microstructure of the segment for carbon thrust bearing.

Further, the present manufacturing process yields consistent grain structure of the segment which is shown in FIG. 2; imparts refined, dense and uniform microstructure of the segment which is shown in FIG. 4; and imparts an optimum strength, ductility, toughness and resistance to impact and fatigue. This dense and uniform microstructure improves physical and mechanical properties of the segments.

The present invention is illustrated more in details in the following example. The example describes and demonstrates embodiments within the scope of the present invention. This example is given solely for the purpose of illustration and is not to be construed as limitations of the present invention, as many variations thereof are possible without departing from spirit and scope.

EXAMPLE 1 a) The stainless steel round bar of grade AISI 420B (SS 420B) was selected as feed stock or raw materials and was undergone cutting operation in cutting press to form billets;

b) Said billets were undergone heating process at temperature of 900° C.-1000° C. in induction furnace;

c) The steel billets obtained in step (b) were undergone hot forging process in mechanical press using closed forging dies for forming segments of desired shape;

d) The segments obtained in step (c) were undergone stress relieving process at temperature of 545° C.-555° C. to reduce internal residual stress and to prevent the formation of excessive thermal stresses;

e) The segments obtained in step (d) were undergone hardening process at temperature of 1040° C. to increase the hardness and toughness and to acquire uniform grain structure of the segment;

f) The segments obtained in step (e) were subjected to tempering process at temperature of 245° C.-255° C. to reduce brittleness and excess hardness;

g) The segments obtained in step (f) were undergone grinding process in grinding machine to acquire finished surface of the segment;

h) The segments obtained in step (g) were successively undergone lapping process and polishing process in lapping machine and polishing machine respectively to obtain optimum degree of surface finishing and flatness for achieving mirror like surface of segment.

Improved mechanical properties of segments obtained by said manufacturing process steps (a-g) are given in below table 1 in comparison with the mechanical properties of segments obtained by conventional investment casting process:

TABLE 1

| Mechanical Properties | Segments obtained by present process | Segments obtained by conventional process |
| --- | --- | --- |
| Hardness | 51 HRC | 46 HRC |
| Compressive | 89.55 KN | 68.70 KN |

TABLE 1-continued

| Mechanical Properties | Segments obtained by present process | Segments obtained by conventional process |
| --- | --- | --- |
| strength | | |

Further, the stainless steel strips/logs of grade SS 420B selected as feed stock or raw materials comprised of the composition given below in Table 2:

TABLE 2

| Sr. No. | Element tested | Obtain value in % | Specified value as per grade SS 420 |
| --- | --- | --- | --- |
| 1 | Carbon as C | 0.308 | 0.15 Min. |
| 2 | Silicon as Si | 0.344 | 1.00 Max. |
| 3 | Manganese as Mn | 0.494 | 1.00 Max. |
| 4 | Sulphur as S | 0.034 | 0.030 Max. |
| 5 | Phosphorous as P | 0.016 | 0.040 Max. |
| 6 | Nickel as Ni | 0.333 | — |
| 7 | Chromium as Cr | 12.171 | 12.00 to 14.00 |
| 8 | Molybdenum as Mo | 0.158 | — |

Advantages:

The novel process of manufacturing of segments for carbon thrust bearing according to present invention is an efficient, economic and timesaving which eliminates tedious and expensive processing steps of conventional manufacturing process of segments for carbon thrust bearing. Further, the present manufacturing process yields consistent grain structure of the segment (as shown in FIG. 2); imparts refined, dense and uniform microstructure of the segment (as shown in FIG. 4) which results in optimum strength, ductility, toughness and resistance to impact and fatigue. The dense and uniform microstructure improves the physical and mechanical properties of the segment for carbon thrust bearing. If the improvement is calculated on practical basis then saving of time, infrastructure, equipments and machineries for production of each segment will reflect in making the manufacturing process cost-effective in terms of lower maintenance, reduced electricity and lower handling efforts. Therefore the manufacturing process of the present invention provides economical significance with respect to current state of art.

I claim:

1. A process of manufacturing of segments for carbon thrust bearing comprising the following steps:
   a) cutting of stainless steel round bars/strips/logs to form steel billets;
   b) heating of the steel billets obtained in step (a) at 900° C.-1000° C. in an induction furnace;
   c) carrying out a hot forging process on the steel billets obtained in step (b) using forging dies for forming segments of a desired shape;
   d) carrying out a stress relieving process on the segments obtained in step (c) at a temperature of 545° C.-555° C. to reduce internal residual stress and to prevent formation of excessive thermal stress;
   e) carrying out a hardening process after the stress relieving process on the segments obtained in step (d) at a temperature of 1040° C. to increase the hardness and toughness and to acquire uniform grain structure of the segments;

f) carrying out a tempering process after the hardening process on segments obtained in step (e) at a temperature of 245° C.-255° C. to reduce brittleness and excess hardness;
g) implementing a grinding process after the tempering process on the segments obtained in step (f) to acquire a finished surface of the segments;
h) implementing a lapping process and a polishing process successively on the segments obtained in step (g) to obtain a mirror-like surface of the segments.

2. The process of manufacturing of segments for carbon thrust bearing as claimed in claim 1 wherein a steel grade of the stainless steel round bars/strips/logs is selected from the group consisting of AISI 420, AISI 420A, AISI 420B, AISI 420C, and AISI 410.

3. The process of manufacturing of segments for carbon thrust bearing as claimed in claim 1 wherein the hot forging process in step (c) is carried out in a mechanical press, a hydraulic press or a friction screw press.

4. The process of manufacturing of segments for carbon thrust bearing as claimed in claim 1 wherein the hot forging process in step (c) is carried out using an open die forging or closed die forging.

5. The process of manufacturing of segments for carbon thrust bearing as claimed in claim 1 wherein a trimming process and a grinding process are successively carried out on the segments obtained in step (c) if open die forging is used as a forging process.

6. The process of manufacturing of segments for carbon thrust bearing as claimed in claim 1 wherein the grinding process in step (g) is carried out in a bench grinder, a vertical rotary grinding machine or a horizontal surface grinding machine.

7. The process of manufacturing of segments for carbon thrust bearing as claimed in claim 1 wherein the hardening process in step (e) is induction hardening.

8. The process of manufacturing of segments for carbon thrust bearing as claimed in claim 1 wherein the lapping process and polishing process in step (h) are successively carried out in a lapping machine and a polishing machine respectively.

9. The process of manufacturing of segments for carbon thrust bearing as claimed in claim 5 wherein the trimming process is carried out in a power press.

* * * * *